(12) United States Patent
Geroulo

(10) Patent No.: US 8,874,610 B2
(45) Date of Patent: Oct. 28, 2014

(54) PATTERN-BASED STABILITY ANALYSIS OF COMPLEX DATA SETS

(75) Inventor: Michael T. Geroulo, Plattsburgh, NY (US)

(73) Assignee: International Business Machines Corporation, Armonk, NY (US)

( * ) Notice: Subject to any disclaimer, the term of this patent is extended or adjusted under 35 U.S.C. 154(b) by 379 days.

(21) Appl. No.: 13/311,586

(22) Filed: Dec. 6, 2011

(65) Prior Publication Data

US 2013/0144908 A1    Jun. 6, 2013

(51) Int. Cl.
*G06F 7/04* (2006.01)
*G06F 17/30* (2006.01)

(52) U.S. Cl.
USPC .......................................... 707/776; 707/688

(58) Field of Classification Search
CPC .............................................. G06Q 10/06393
See application file for complete search history.

(56) References Cited

U.S. PATENT DOCUMENTS

| | | | |
|---|---|---|---|
| 3,771,059 A | 11/1973 | Butler et al. | |
| 5,181,259 A | 1/1993 | Rorvig | |
| 5,842,202 A | 11/1998 | Kon | |
| 6,092,919 A | 7/2000 | Calise et al. | |
| 2003/0225651 A1 | 12/2003 | Chen | |
| 2008/0082377 A1* | 4/2008 | Kennis et al. | 705/7 |
| 2009/0013075 A1* | 1/2009 | Kato | 709/224 |
| 2011/0112974 A1* | 5/2011 | Hinton et al. | 705/317 |
| 2013/0054396 A1* | 2/2013 | Goldfinger et al. | 705/21 |

\* cited by examiner

*Primary Examiner* — Bruce Moser
(74) *Attorney, Agent, or Firm* — Tutunjian & Bitetto, P.C.; Henri D. Schnurmann

(57) ABSTRACT

Methods and systems for identifying stability exceptions in a data log are disclosed. In one method, at least one key that is present in the data log is determined. The data log is comprised of at least one data set, at least one of which includes a plurality of iterations indicating states of the corresponding data set at different points in time. For each data set and for each key, a map is generated. The map indicates, for each iteration of the corresponding data set, whether the corresponding key is present in the corresponding iteration. Moreover, at least one expression pattern rule that models data item stability characteristics over data set iterations is compared to each of the maps to determine whether the corresponding map satisfies the one or more expression pattern rules. Further, at least one unstable data item is identified in the data log based on the comparison.

25 Claims, 5 Drawing Sheets

PATTERN-BASED STABILITY ANALYSIS OF COMPLEX DATA SETS

BACKGROUND

1. Technical Field

The present invention relates to analysis of data records, and, more particularly, to methods, systems and devices that conduct stability analysis on complex data sets.

2. Description of the Related Art

Many supply chain applications exhibit significant run to run variations that are, at least in part, a function of shifts in data, rules and parameters. While data is a key driver, individual data sets tend to be both large and complex, thereby rendering query based analysis of run to run shifts in data sets tedious, difficult, time consuming, inconsistent and error prone.

Query-based net change analysis of data sets operates on limited comparisons between a horizon current data set and a prior data set. Because queries are limited to table-specific standard Structured Query Language (SQL) queries, rule-based directives are out of the scope of these types of analyses. The query-based net change result consists of a list of item quantity pairs with indications that differences occur or do not occur between elements of a given pair. Balancing performance with the capability of analyzing large data sets is problematic. For example, complex queries run against large data sets can easily consume hours of monitoring time by a user and can consume significant system resources. For very large data sets, queries can often fail to produce a result.

Beyond straight SQL-based queries, stored procedures or Java Database Connectivity (JDBC)/Open Database Connectivity (ODBC)-based applications can be used to extend analysis capability and thereby provide sophisticated diagnostics. However, use of such objects involves custom programming, which is seldom reusable across different data sets. As with straight SQL-based analysis methods, resource and performance issues arise with the application of extended capabilities to very large data sets, or to sets of very large data sets.

SUMMARY

One embodiment is directed to a method for identifying stability exceptions in a data log. In accordance with the method, one or more keys that are present in the data log are determined. The data log is comprised of at least one data set, at least one of which includes a corresponding plurality of iterations indicating states of the corresponding data set at different points in time. In addition, each key denotes a different, respective data item in the data log. For each data set and for each key, a map is generated. The map indicates, for each iteration of the corresponding data set, whether the corresponding key is present in the corresponding iteration. Moreover, at least one expression pattern rule that models data item stability characteristics over data set iterations is compared to each of the maps to determine whether the corresponding map satisfies the one or more expression pattern rules. Further, at least one unstable data item is identified in the data log based on the comparison.

An alternative embodiment is directed to a computer readable storage medium comprising a computer readable program for identifying stability exceptions in a data log. The computer readable program when executed on a computer causes the computer to perform the steps of the method embodiment described above.

Another embodiment is also directed to a method for identifying stability exceptions in a data log. In the method, a data log that is comprised of at least one data set is received. At least one of the data sets includes a corresponding plurality of iterations indicating states of the corresponding data set at different points in time. In addition, at least one data item in the data log is denoted as a key, where each key denotes a different, respective data item in the data log. For each of the keys, a data coverage of the corresponding key for each iteration of the data log is determined. Here, the data coverage denotes a degree to which the corresponding key constitutes the data log in a given iteration. For each of the keys, a map indicating whether the data coverage of the corresponding key has changed between iterations of the data log is generated. Further, at least one expression pattern rule that models data item stability characteristics over data log iterations is compared to each of the maps to identify at least one unstable data item in the data log.

An alternative embodiment is directed to a system for identifying stability exceptions in a data log. The system includes a parser, a data encoder and a data matcher. The parser is configured to receive the data log, which is comprised of at least one data set. At least one of the data sets includes a plurality of iterations indicating states of the corresponding data set at different points in time. In addition, at least one data item in the data log is denoted as a key, where each key denotes a different, respective data item in the data log. The data encoder is configured to determine, for each of the keys, a data coverage of the corresponding key for each iteration of the data log. Here, the data coverage denotes a degree to which the corresponding key constitutes the data log in a given iteration. The data encoder is further configured to generate, for each of the keys, a map indicating whether the data coverage of the corresponding key has changed between iterations of the data log. The data matcher is configured to compare at least one expression pattern rule that models data item stability characteristics over data log iterations to each of the maps to identify at least one unstable data item in the data log.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
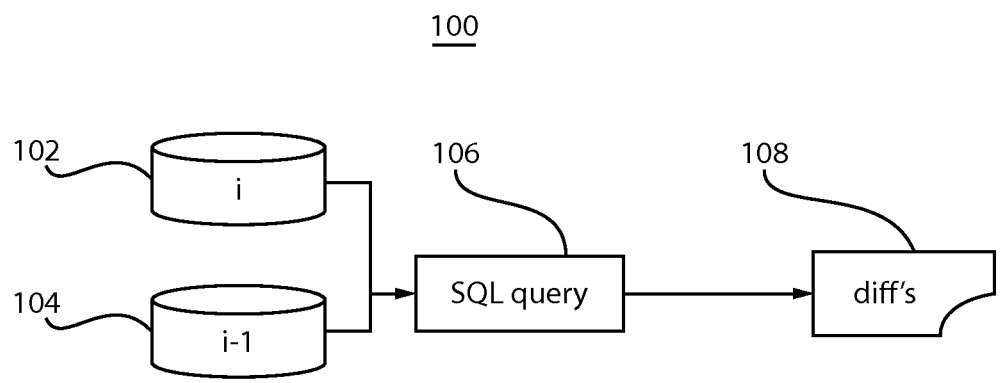
FIG. 1 is a high level block/flow diagram of a system/method for query-based analysis of data records.

Exemplary embodiments of the present principles employ pattern-based data set stability analysis. The pattern-based data set stability analysis can utilize a core transformation that converts a stream of historically sequenced relational database records that are sampled from a diverse group of input and output data sets into generic {binary, tertiary} string pairs. The pairs can then, independent of the source record format, be efficiently and effectively evaluated for conformance to regular expression directives designed to identify item-specific, frequent inter-cycle fluctuations and to establish an accurate expectation for future stability. In particular, data records of data sets can be analyzed to generate maps detailing the behavior of data items across iterations that denote the state of the data sets at different points in time. For example, such maps can include indications of whether the data items are present across different iterations or can denote changes in coverage of the data items across iterations. In addition, stability and exception patterns that are similarly structured to model stability characteristics across iterations can be used to accurately identify unstable data items. The pattern-based analysis can further develop a data set level stability key performance indicator (KPI) suitable for use as a process control metric.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

As indicated above, exemplary embodiments of the present principles can employ pattern-based techniques to analyze the stability of data sets. The pattern-based analysis can operate on an extended series of data sets, including current and N−1 prior iterations, where N−1>1. The analysis is driven by pattern matching and need not utilize SQL. Results of the analysis can include both problem items and higher level KPIs. It can be shown that the analysis techniques described herein are extremely efficient for more than one million, and even more than ten million, row data sets. The analyzer can apply pattern rules to $n=1, \ldots, N$ corresponding versions of $m=1, \ldots, M$ data sets to derive stability KPI metrics and to identify problem items in the data sets. Feedback of KPI performance over time can be used to refine future evaluations.

Figure 2:
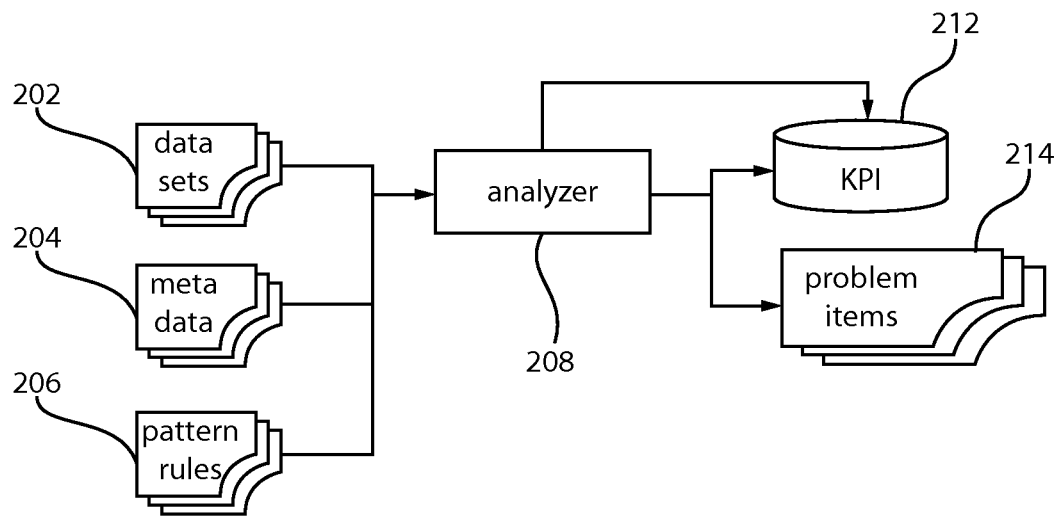
FIG. 2 is a high level block/flow diagram of an overview of a system/method for pattern-based analysis of data records in accordance with an exemplary embodiment.

Referring now to the drawings in which like numerals represent the same or similar elements and initially to FIGS. 1 and 2, process flow diagrams for query-based analysis and pattern-based analysis schemes are illustratively depicted for comparison purposes. In accordance with a query-based system 100, as indicated above, an SQL query module 106 analyzes two iterations, denoted as i 102 and i−1 104, of a given data set to output a simple set 108 of differences between the two iterations. In contrast, an analyzer 208 of a pattern-based system 200 analyzes a plurality of data sets 202 and corresponding meta data 204 for the data sets using pattern rules 206 to output one or more KPIs 212 for each data set and/or a set of problem items 214.

Figure 3:
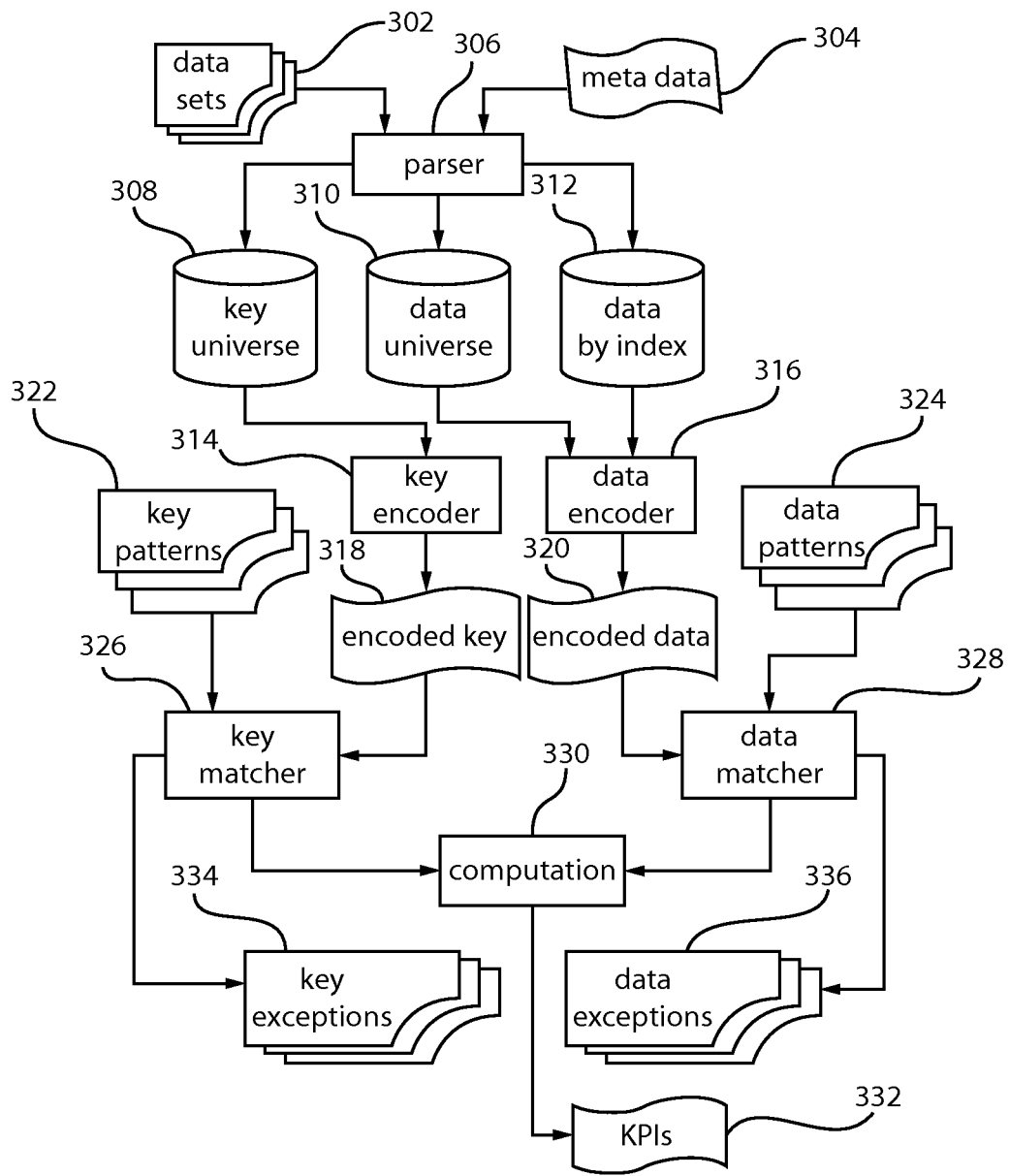
FIG. 3 is a high level block/flow diagram of a system/method for identifying stability exceptions in a data log in accordance with an exemplary embodiment.

For example, a more detailed block/flow diagram of a pattern-based analyzation system/method 300 is depicted in FIG. 3. Here, the analyzer 208 can be implemented by a plurality of modules, including a parser 306, key 314 and data 316 encoders, key 326 and data 328 matchers and a computation module 330. The functions of the various blocks of the system/method 300 are described below with respect to specific method embodiments.

Figure 4:
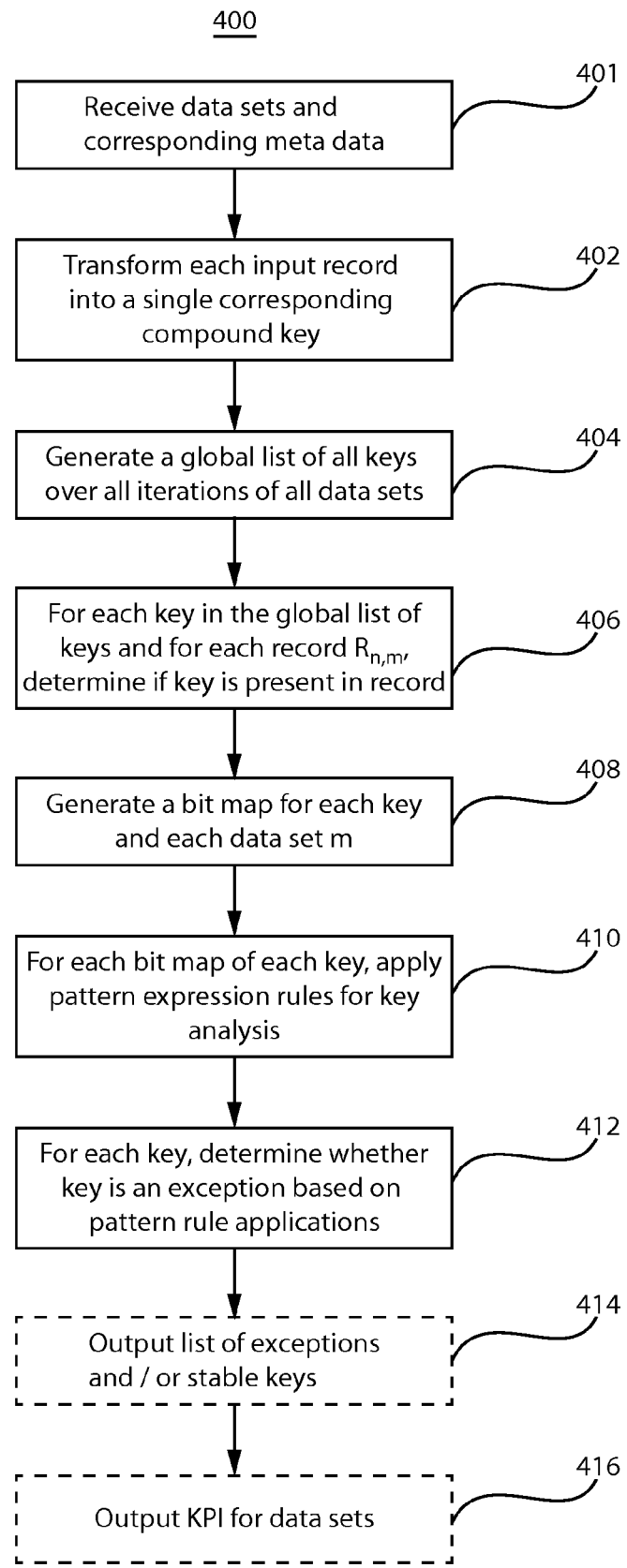
FIG. 4 is a high level block/flow diagram of a method for identifying stability exceptions in a data log using key transforms in accordance with an exemplary embodiment.

Referring now to FIG. 4, with continuing reference to FIG. 3, an exemplary key transformation method 400 for identifying stability exceptions in a data log is illustratively depicted. The method 400 can be performed by the system 300 and can begin at step 401, at which the parser 306 can receive data sets 302 and corresponding meta data 304.

At step 402, the parser 306 can transform each input record of data sets 302 into a single corresponding compound key using meta data 304. For example, a simple key is a single alpha-numeric identifier that identifies a data object. In contrast, a compound key is a string comprised of N>1 simple keys partitioned by a selectable delimiter character, which uniquely identifies a data object. For example: if a given simple key '#12X5582' represents a product, a simple key 'Boston' represents a demand location, a simple key 'N.E. Hub' represents a supply location and '~' is established as a delimiter character, then '#12X5582~Boston~N.E. Hub' would be a compound key that represents 'Boston'-based demand for product '#12X5582' that is fulfilled by 'N.E. Hub.'

In accordance with one exemplary embodiment, the data sets 302 are referred to as a data log. In general, a data log can be comprised of at least one data set in embodiments of the present principles. Here, each record can be denoted by $R_{n,m}$, where $n=1, \ldots, N$ denotes a particular iteration of a data set and $m=1, \ldots, M$ denotes a particular data set. Different iterations n of a data set m can denote different instances in time for the particular data set. For example, a given data set m can be a listing of pending orders for a business for which the data sets have been generated. Other examples include, but are not limited to, a) bill of material (BOM) structures, b) dated supply commitments for key commodities, c) product sourcing rules, d) master data, e) feature attach ratios and f) manufacturing parameters, such as yield, offsets, and capacities. At least one data set of the data log can include a corresponding plurality of iterations indicating states of the corresponding data set at different points in time. Although all data sets are described as having $n=1, \ldots, N$ iterations for convenience purposes and for ease of understanding, there may be a different total number of iterations for each data set m.

At step 404, the parser 306 can generate a global listing 308 of all keys that are present over all iterations $n=1, \ldots, N$ of all $m=1, \ldots, M$ data sets. For example, a key can denote a particular data item of interest in a data set. For example, a particular data item of interest may be a pending or a standing order in a listing of pending orders data set. Thus, each key can denote a different, respective data item in the data log. The keys can be identified by a user and can be provided in the meta data 304 for each data set m and/or each record $R_{n,m}$. The parser 306 can parse through the records of the data sets 302 and can determine the presence of one or more keys in the data sets 302. In addition, the parser 306 can index the keys as $j=1, \ldots, J$, where J is the total number of keys in the data sets 302.

At step 406, the key encoder 314 can, for each key j and for each record index $R_{n,m}$, determine if the corresponding key j is present in the record $R_{n,m}$. Based on these determinations, at step 408, the key encoder 314 can generate a bit map, $K_{j,m}$, for each key j and for each data set m. In addition, the bit map can indicate, for each iteration n of the corresponding data set m, whether the corresponding key j is present in the corresponding iteration n. Here, the length of the bit map is the total number of iterations, N, where each position in the bit map denotes a different iteration for the corresponding data set m. Further, a "1" indicates that the key j is present in a specific iteration n of the data set m and a "0" indicates that the key j is absent from an iteration n of the data set m. For example, assume that there are N=8 total iterations and that a key j was present in iterations n=1, 2, 4, 7 but was absent from iterations n=3, 5, 6, 8. The corresponding bitmap $K_{j,m}$ for this example would be "11010010." The key encoder 314 can compile all bit maps into an encoded key 318 for use by the key matcher 326, as described in more detail herein below.

At step 410, the key matcher 326 can apply or compare one or more expression pattern rules 322 for key analysis to each bit map $K_{j,m}$ of each key to determine whether the corresponding map $K_{j,m}$ satisfies at least one of the expression pattern rules 322. The pattern rules 322 can model stability characteristics or qualities of data items over data set iterations. For example, pattern rules 322 can include the following exemplary expressions:

| | |
|---|---:|
| ".*10+1+0+.*" | exception pattern 1: |
| ".*01+0+1+.*" | exception pattern 2: |
| ".*0000$|.*1111$" | stability pattern: |

The expression pattern rules can be input by the user or the system can be pre-configured with the pattern-based rules. In the expression pattern rules described herein, ".*" denotes zero, one or a plurality of positions in a map, which can be zero or more occurrences of any character; "X+" denotes a set of consecutive, identical characters X, where the set consists of one or more occurrences of X; $ denotes the end of a substring; and "X|Y" denotes that the presence of X, Y, or both X and Y in a map satisfies the rule. Pattern specifications described here conform to standard, regular expression syntax. For example, exception pattern (1) ".*10+1+0+.*" translates to a string of characters consisting of zero or more occurrences of any character followed by '1' followed by one or more occurrences of '0' followed by one or more occurrences of '1' followed by one or more occurrences of '0' followed by zero or more occurrences of any character. In addition, exception pattern (2) is the inverse of (1). That is, exception pattern (2) ".*01+0+1+.*" translates to a string of characters consisting of zero or more occurrences of any character followed by '0' followed by one or more occurrences of '1' followed by one or more occurrences of '0' followed by one or more occurrences of '1' followed by zero or more occurrences of any character. The key stability pattern ".*0000$|.*1111$" translates to a string which begins with zero or more occurrences of any character that ends in the sub-string "0000" or "1111". The exemplary methods described here employs two exception patterns for keys (described herein above), two exception patterns for data (described in more detail herein below), and stability patterns—one for keys (described herein above) and one for data (described in more detail herein below).

The exception patterns 1 and 2 provided above model an unstable data item while the stability pattern provided above models a stable data item. Each of the exemplary expression pattern rules provided above includes a set of consecutive iterations. In the exception patterns 1 and 2, transitions between iterations in the set of consecutive iterations denote state switches. For example, in the set of consecutive iterations "10+1+0+" in the exception pattern 1, the transition between the first position (from left to right) denoting a given iteration of a given data set and the second position denoting the next iteration of the data set indicates that the state is switched from "1" to "0." A following transition denotes a state switch from "0" to "1," and a following transition denotes a state switch from "1" to "0." In turn, in the sets of consecutive iterations "0000" and "1111" of the stability pattern, each transition between iterations in the set of consecutive iterations denotes a state consistency of "0" and "1," respectively. The total number of iterations in each set can be varied based on, for example, empirical data.

At step 412, the key matcher 326 can determine, for each key, whether the key is an exception based on the applications of the expression pattern rules 322. For example, if a given bitmap $K_{j,m}$ satisfies an exception pattern, then the key matcher 326 deems or identifies the corresponding key j to be an exception. Otherwise, the key matcher 326 deems the key to be unremarkable. Alternatively, the key matcher 326 can be configured to apply stability pattern rules such that all keys that satisfy a stability pattern rule are deemed or identified as unremarkable and all other keys are deemed exceptions. For example, the key matcher 326 would deem a key with a bitmap of "11111000" (a) to be unremarkable and would deem a key with a bitmap of "11010010" (b) to be an exception. Here, an exception key is an item that repeatedly flits in and out of the sequenced stream of data sets which make up the data input. If, for example, the sample patterns were derived from order book data, the (a) case would likely imply that a specific order was on the books for the approximately five iterations and was then dropped off for the last 3 iterations, which is normal business behavior. However, case (b) would imply that the specific order of interest was present in the order book data, then not present, then present, then not present, etc., and finally not present, which indicates that the order of interest exhibits unexpected, inter-cycle order instability. The expression pattern rules should be configured to account for this type of instability and can be tailored to the specific keys or items of interest analyzed.

Optionally, at step 414, the key matcher 326 can output a list 334 of key exceptions (e.g., unstable data items) and/or of stable keys based on the determinations made at step 412.

Optionally, at step 416, the computation module 330 can output a KPI 332 for the M data sets composing the data log based on the determination step 412. The KPI can be calculated as the number of keys that are deemed stable (or not exceptions) by step 412 or the percentage of the J keys that are deemed stable (or not exceptions) by step 412.

Figure 5:
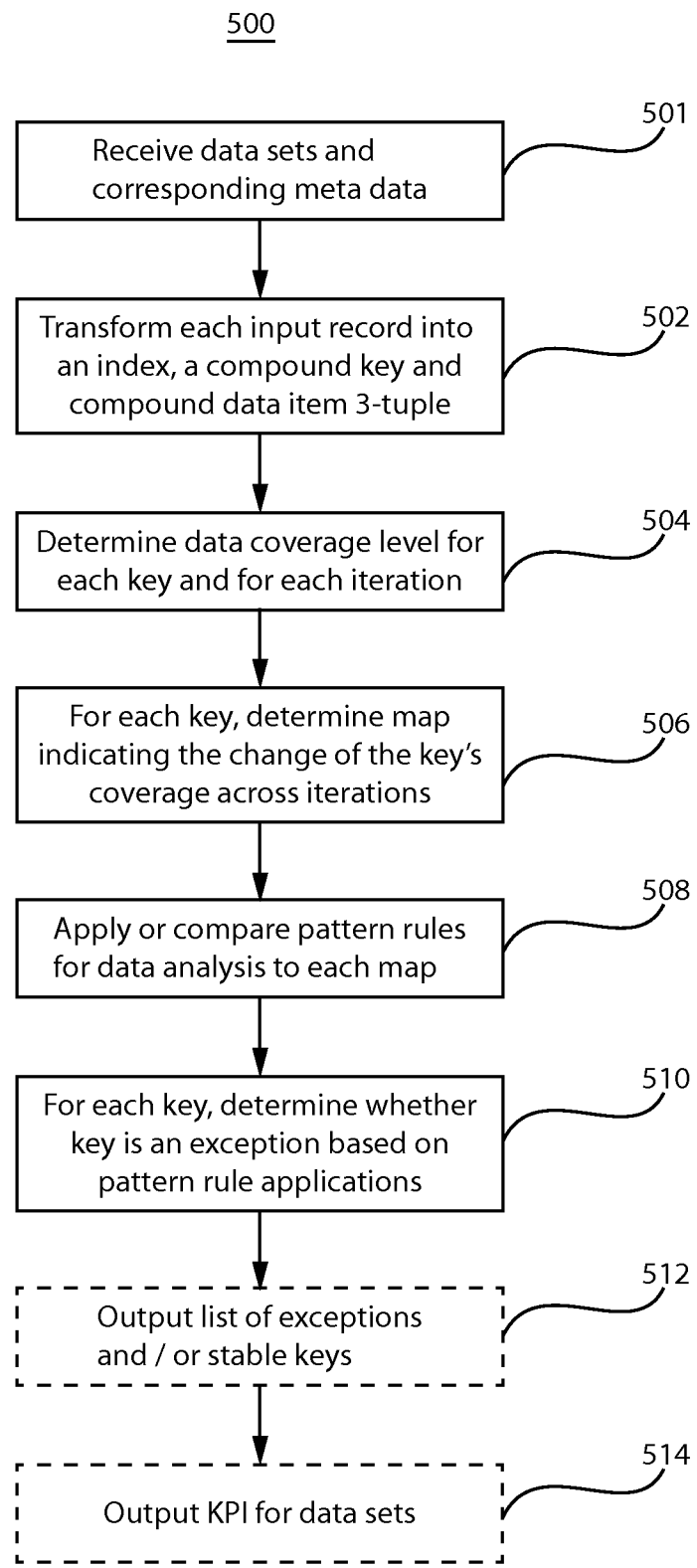
FIG. 5 is a high level block/flow diagram of a method for identifying stability exceptions in a data log using data transforms in accordance with an exemplary embodiment.

Referring now to FIG. 5, with continuing reference to FIGS. 2-4, a data transformation method 500 for identifying stability exceptions in a data log is illustratively depicted. The method 500 can also be performed by the system 300 and can be performed in parallel with the method 400. Alternatively, the methods 400 and 500 can be performed independently. The method 500 can begin at step 501, at which the parser at 306 can receive data sets 302 and corresponding meta data 304. As noted above, the data sets 302 are referred to as a data log, which, in general, can include one or more data sets. Further, as also noted above, at least one of the data sets 302 can include a corresponding plurality of iterations indicating states of the corresponding data set at different points in time. In addition, at least one data item in the data log can be denoted as a key, where each key denotes a different, respective data item in the data log. As stated above, key information for each data record of each data set can be provided in the meta data 304. It should be noted that steps 501 and 401 can be implemented as the same step when the methods 400 and 500 are performed in parallel.

At step 502, the parser 306 can transform each record $R_{n,m}$, for all n and m, into a 3-tuple composed of an index, a compound key and a compound data item. As with a compound key, which was described above, a compound data item consists of a string comprised of N>1 data fields partitioned by a pre-established delimiter character. A simple example of a compound data item is a dated demand. For example, assume a demand for 100 units of some product on date 20111111. Assume also that the delimiter character is set to '~'. Accordingly, the corresponding compound data item would be the string "100~20111111". A slightly more complex example of a compound data item is a bill of material record for an assembly specifying two units of some part needed to build some portion of the assembly, where the specification is effective for build dates occurring between 20110901 and 20111230. The corresponding compound data item would be "2~20110901~20111230". For each data type m=1, . . . , M, for each iteration n=1, . . . , N, the parser 306 can employ meta data to transform each input record $R_{n,m}$ to a compound {key, data pattern, data index}, which is then logged to a plurality of data structures that a) maintain linkage of keys to data sets and b) are used to derive the KPI result. For each data type m=1, . . . , M, the parser 306 develops: 1) a key universe table consisting of the union of all keys over all iterations n=1, . . . , N and 2) a data universe table, which, for each member j=1, . . . , J of the key universe, contains a listing of the union of all data patterns d=1, . . . , D over all iterations n=1, . . . , N.

At step 504, the data encoder 316 can determine the data coverage level for each key for all data items over all iterations and data sets based on the repository 312 and the log 310. Data coverage denotes a degree to which a key constitutes a data log in a given iteration. For example, for each key j=1, . . . , J and for each iteration n=1, . . . , N of the data log, the data encoder 316 can determine the percentage or fraction of the totality of the data items in the given iteration n that the key constitutes. As noted above, the keys can be identified by a user and can be provided in the meta data 304 for each data set m and/or each record $R_{n,m}$. In one exemplary implementation, the keys can comprise all data items over all data sets and all iterations.

At step 506, for each key j, the data encoder 316 can determine a map indicating the change in the key j's coverage across iterations. Here, the data encoder 316 can determine whether the data coverage of the corresponding key has changed between iterations of the data log. For example, for a given key j, the encoder 316 can sequence through the coverage results for each iteration to determine if data item coverage by the key j has increased, decreased or remained unchanged when transitioning from iteration "i" to iteration "i+1". The end result is a bitmap-like pattern, for example "1ee01e0", where for a given position in the map "i", which denotes a particular iteration, an "e" indicates no change in coverage level between "i−1" and "i", a "0" indicates coverage has decreased and a "1" indicates coverage has increased. The data encoder 316 can compile all maps into encoded data 320 for use by the data matcher 328, as described in more detail herein below.

At step 508, the data matcher 328 can apply or compare pattern rules 324 that model data item stability characteristics or qualities over data log iterations for data analysis to each map generated at step 506. Similar to the key-based pattern rules described above, the expression pattern rules 324 can be input by the user or the system can be pre-configured with the pattern rules 324. Examples of expression pattern rules 324 include the following expressions:

| ".*0.*1.*0.*" | exception pattern 1: |
| ".*1.*0.*1.*" | exception pattern 2: |
| ".*000$|.*111$|.*eee$" | tail stability pattern: |

The exception patterns 1 and 2 model an unstable data item while the stability pattern models a data item that exhibits tail stability. The exception patterns 1 and 2 include elements that denote transitions between iterations. For example, each "0" or "1" in the exception patterns denotes a transition between a given iteration "i" to iteration "i+1." Further, in the exemplary exception patterns 1 and 2 provided here, the elements denote at least two state switches between an increasing data coverage and a decreasing data coverage of an unstable data item modeled by the expression pattern. For example, the elements of the exception pattern ".*0.*1.*0.*" indicate that a given data item has switched between a decreasing coverage in a given transition to an increasing coverage in a later transition and has again switched to a decreasing coverage in yet a later transition. In another example, the elements of the exception pattern ".*1.*0.*1.*" indicate that a given data item has switched between an increasing coverage in a given transition to a decreasing coverage in a later transition and has again switched to an increasing coverage in yet a later transition. In turn, the tail stability patterns ".*000$", ".*111$" and "*eee$" each include a set of elements that denote consecutive transitions between some iteration "i" to iteration "i+1," between iteration "i+1" to iteration "i+2," and between iteration "i+2" to iteration "i+3", where the transitions of interest occur at the end or tail of the transition bit map-like map. Further, the set of elements ".*000$", ".*111$" and "*eee$" of the stability patterns denote a state consistency of "0", "1" and "e", respectively. Although the patterns presented here are composed of three iterations, the total number of iterations in each set can be varied based on, for example, empirical data.

At step 510, the data matcher 328 can determine, for each key j, whether the key j is an exception based on the applications of the expression pattern rules 324 at step 508. For example, if a map for a given key j satisfies any of the exception rules, then data matcher 328 deems or identifies the key j as being associated with a data exception. Otherwise, the data matcher 328 deems or identifies the key j to be unremarkable with respect to data. Alternatively, the data matcher 328 can be configured to apply or compare stability pattern rules such that the keys of all maps that satisfy a stability pattern rule are deemed unremarkable and all other keys are deemed or identified as exceptions. For example, the data matcher 328 would deem a key with a map of "eeee0ee" (a) to be unremarkable or stable. In turn, the data matcher 328 would deem a key with a map of "1ee01e0" (b) to be associated with a data exception. Here, an exception key is basically a data item that has a coverage level that repeatedly fluctuates up and down over the sequenced stream of data sets which make up the data input. If the sample patterns were derived from forecasted demand data, then case (a) would likely imply a normal, inter-cycle adjustment, whereas case (b) would imply unexpected, frequent inter-cycle fluctuations. The expression pattern rules should be configured to account for this type of instability and can be tailored to the specific keys or items of interest analyzed.

Optionally, at step 512, the data matcher 326 can output a list 336 of key or data item exceptions and/or of stable keys or data items based on the determinations made at step 510.

Optionally, at step 514, the computation module 330 can output a KPI 332 for the M data sets based on the comparison and determination at steps 508 and 510, respectively. The KPI can be calculated as the number of keys or data items that are deemed stable (or not exceptions) by step 510 or the percentage of the keys or data items that are deemed stable (or not exceptions) by step 510.

It should be understood that steps 514 and 416 can be separate steps or can constitute the same step. For example, where steps 514 and 416 constitute the same step, the KPI 332 can be calculated as the number of keys or data items that are deemed stable (or not exceptions) by both step 510 and 412 or the average of the percentages of the keys or data items that are deemed stable (or not exceptions) by steps 510 and 412. In certain implementations, for each data type m=1, . . . , M, a key exception index $KEX_m$ can be calculated as the ratio of the size of the key exception list to the size of the key universe. In addition, the data exception index $DEX_m$ can be set to the ratio of the size of the data pattern exception list to the size of the data pattern universe. Thereafter, a $KPI_m$ 332 can be calculated as follows: $KPI_m = W_{k,m} * KEX_m + W_{d,m} * DEX_m$, where parameters $W_{k,m}$ and $W_{d,m}$ are discount factors for key and data pattern exceptions which account for expected inter-iteration volatility.

It should be noted that some input data types, for example input data related to demand for products sold by a business for which the system 300 performs analysis, are expected to be more volatile than other input data types, such as bill of material structures. However, base KPI derivation is insensitive to business context. If the index set for a given evaluation tends to roll overtime—for example, the analysis base this month might be {751, 752, 753, 850} and the base for next month shifts to {752, 753, 850, 851}—then control limits for specific data types can be established by the analyzer 208 by collecting KPI's as they evolve over the shifting iteration sets. Here, each entry in a set corresponds to a KPI determined for a given iteration of data sets. In this example, the time between iterations is one month.

In addition, an exemplary syntax of a data set input can conform to the following convention:

```
<record>:=<index>[<delimiter><key>]+
       |[<delimiter><data>]+
```

In other words, a record can be denoted by an index followed by any combination or permutation of delimited key fields and data fields. The parser 306 can parse each input record from left to right. Keys can also be assembled into a single compound key field and data can be assembled into a single compound data field, as described above with respect to methods 400 and 500. A key field contains an identifier which is used to represent some item. An example of a key field used to represent a person object is LAST_NAME. It is often the case that a single key field fails to uniquely distinguish the object of interest, so multiple key fields can be used—e.g., First name, last name. Data fields contain attributes associated with the object specified by the key field(s)—e.g., Address, age, gender. Any system which operates on records comprised of some combination of key and data fields should understand the structure or layout of the record. It may not be clear, for example, if a field with a value of ASICS represents a key or data. Meta data is used to specify record structure and field characteristics. "KEY,KEY,DATA,DATA,DATA" is one possible meta data specification for the record "john,doe,23$^{rd}$ Ave,34,M".

As indicated above, each input data set 302 can be associated with a corresponding meta data record 304. Meta data is used to specify type association for each data record field so that data records can be parsed, as described above. An exemplary syntax of meta data for a data set can conform to the following convention:

```
<metarecord>:=<meta_char>
        [<delimiter><meta_char>]+
```

Here, <metachar> can be defined as follows: <metachar>:= [x|k|d|v|s|g|n|–], where "x" is the index key for an iteration of a data set, "k" is the key field, "d" is the data field, "v" is a variable field mapped to the generic "*" character, "s" is string data that is subject to string filtering, "g" is unfiltered string data, "n" is numeric data that is subject to numeric filtering and "–" indicates that the field should be ignored completely. String and/or numeric filters can be used to cull records from the analysis if those records contain known anomalies.

An embodiment of the KPI analyzer 208 was applied to a sampling of Manufacturing Resource Planning (MRP) data sets obtained from an enterprise level biweekly Commit to Sales (CTS) process for two process cycles. Each data source in each cycle contained multiple base indices, where the cycle 1 index set rolled to the cycle 2 index set. Here cycles 1 and 2 or samples 1 and 2 denote analyses conducted for two consecutive months, respectively. For example, in cycle 1, orders contained bases {747, 751, 755, 756, 760, 766, 769, 770, 771, 772, 773, 774}, while cycle 2 contained bases {751, 755, 756, 760, 766, 769, 773, 775, 776, 777}. Tables 1 and 2 below describe statistical data concerning cycles 1 and 2, respectively. In each table, the columns, from left to right, denote: a) the file type of data sets, b) whether the data set is an input or output of the enterprise system, c) the total number of data records, d) the total number of data sets, e) the format of the meta data for the corresponding data sets and f) the processing time employed to analyze the data sets in accordance with methods 400 and 500. Each line in Table 1 or 2 can denote a separate data log on which the methods 400/500 can be applied. All sample data types referred to in the tables are related to MRP-type systems, where BOM is bill of material and RATIOS is attach ratios, which are similar to BOM except that attach ratios refer to utilization of configurable features on a product, whereas BOM structures specify components on lower level assemblies. PEGGING describes a result where lower level component demand is lined to top level demand drivers, PLANNING refers to exploded demand and BACKLOG and FORECAST correspond to top level demand expressed in terms of orders and forecasted demand.

TABLE 1

CYCLE 1

| file type | I/O | Records | sets | meta data | process time |
|---|---|---|---|---|---|
| BOM$^{production}$ | input | 3.9M | 12 | x, k, k, k, d, v, d, — | 0 m 52 s |
| ratios$^{production}$ | input | 2.2M | 6 | x, k, k, k, d, d, d | 0 m 39 s |
| orders$^{production}$ | output | 0.4M | 12 | x, k, k, k, k, d, d | 0 m 06 s |
| planning$^{production}$ | output | 19.6M | 13 | x, k, k, k, k, d, d | 2 m 55 s |
| pegging$^{production}$ | output | 12.5M | 7 | x, k, k, d, d, d, d | 1 m 37 s |
| backlog$^{UAT}$ | input | 9.9K | 6 | x, k, k, k, k, k, d, d | 0 m 01 s |
| forecast$^{UAT}$ | input | 0.4M | 6 | x, k, k, k, k, k, d, d | 0 m 05 s |
| Total | | 38.6M | | | 7 m 38 s |

TABLE 2

CYCLE 2

| file type | I/O | Records | sets | meta data | process time |
|---|---|---|---|---|---|
| BOM$^{production}$ | input | 3.3M | 10 | x, k, k, k, d, v, d, — | 0 m 51 s |
| ratios$^{production}$ | input | 3.1M | 10 | x, k, k, k, d, d, d | 1 m 00 s |
| orders$^{production}$ | output | 0.3M | 10 | x, k, k, k, k, d, d | 0 m 05 s |
| planning$^{production}$ | output | 15.5M | 10 | x, k, k, k, k, d, d | 2 m 21 s |
| pegging$^{production}$ | output | 16.4M | 10 | x, k, k, d, d, d, d | 2 m 30 s |
| backlog$^{UAT}$ | input | 16.4K | 10 | x, k, k, k, k, k, d, d | 0 m 01 s |
| forecast$^{UAT}$ | input | 0.6M | 10 | x, k, k, k, k, k, d, d | 0 m 07 s |
| Total | | 39.3M | | | 5 m 34 s |

Figure 6:
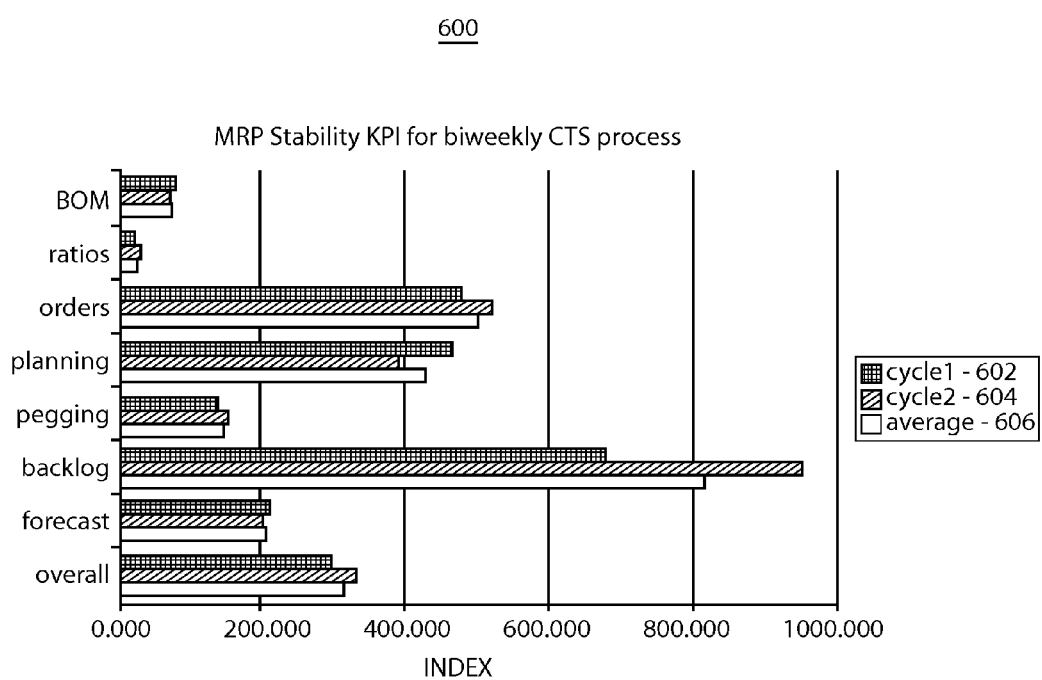
FIG. 6 is a graph of key performance indicators, for different types of data sets over a plurality of cycles, determined in accordance with exemplary embodiments of the present principles.

FIG. 6 provides a graph 600 depicting the KPI results of cycles 1 602 and 2 604 for each of the data types as well as the average KPI results 606 of cycles 1 and 2. Here, the stability KPI, denoted on the x-axis of the graph 600, output by the analyzer 208 is a number between zero and 1000, where lower levels correspond to small inter-cycle fluctuations of key and/or data patterns.

As indicated above, some data types are inherently more volatile than others. For example, demand-type files tend to exhibit more variability than structure-type files. Within demand-type files, the expected variability of backlog/orders-type files normally exceeds that of forecast/planning-type files. A large gap between structure-type KPI levels and demand-type KPI levels is typically normal behavior. If, however, a given data type were to exhibit a significant swing as the measurement base rolls from one historically sequenced stream to an updated historically sequenced stream, then the KPI gap would correspond to a strong indicator of aberrant behavior. In like fashion, a large point to point swing in the gap between different data types would also be indicative of a problem. The entire plot over all data types and observation points represents a process control footprint. The footprint can be used to monitor the quality of production runs, and/or to validate test data as compared to production data.

Having described preferred embodiments of systems and methods for pattern-based stability analysis of complex data sets (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for identifying stability exceptions in a data log comprising:
   determining at least one key that is present in the data log, wherein the data log is comprised of at least one data set, at least one of which includes a corresponding plurality of iterations indicating binary transition states of the corresponding data set at different points in time, and wherein each key of the at least one key denotes a different, respective data item in the data log;
   for each data set of the at least one data set and for each key of the at least one key, generating a map indicating, for each iteration of the corresponding data set, whether the corresponding key is present in the corresponding iteration;
   determining adherence, by a processor, of at least one expression pattern rule that models data item stability characteristics over data set iterations to the map generated for each data set and for each key to determine whether the corresponding map satisfies the at least one expression pattern rule; and
   identifying at least one key exception as at least one unstable data item, respectively, in the data log based on the determining adherence.

2. The method of claim 1, wherein the method further comprises:
   outputting a key performance indicator for the data log based on the identifying.

3. The method of claim 1, wherein the method further comprises:
   outputting a list that includes the at least one unstable data item.

4. The method of claim 1, wherein the at least one expression pattern rule models an unstable data item.

5. The method of claim 4, wherein the at least one expression pattern rule includes a set of consecutive iterations and wherein transitions between iterations in the set of consecutive iterations denote state switches.

6. The method of claim 1, wherein the at least one expression pattern rule models a stable data item.

7. The method of claim 6, wherein the at least one expression pattern rule includes a set of consecutive iterations and wherein each transition between iterations in the set of consecutive iterations denotes a state consistency.

8. A non-transitory computer readable storage medium comprising a computer readable program for identifying stability exceptions in a data log, wherein the computer readable program when executed on a computer causes the computer to perform the steps of:
   determining at least one key that is present in the data log, wherein the data log is comprised of at least one data set, at least one of which includes a corresponding plurality of iterations indicating binary transition states of the corresponding data set at different points in time, and wherein each key of the at least one key denotes a different, respective data item in the data log;
   for each data set of the at least one data set and for each key of the at least one key, generating a map indicating, for each iteration of the corresponding data set, whether the corresponding key is present in the corresponding iteration;
   determining adherence of at least one expression pattern rule that models data item stability characteristics over data set iterations to the map generated for each data set and for each key to determine whether the corresponding map satisfies the at least one expression pattern rule; and
   identifying at least one key exception as at least one unstable data item, respectively, in the data log based on the determining adherence.

9. The computer readable storage medium of claim 8, wherein the computer readable program when executed on the computer further causes the computer to perform the step of:
   outputting a key performance indicator for the data log based on the identifying.

10. The computer readable storage medium of claim 8, wherein the computer readable program when executed on the computer further causes the computer to perform the step of:
    outputting a list that includes the at least one unstable data item.

11. A method for identifying stability exceptions in a data log comprising:
    receiving the data log, which is comprised of at least one data set, at least one of which includes a corresponding plurality of iterations indicating binary transition states of the corresponding data set at different points in time, wherein at least one data item in the data log is denoted as a key, wherein each key denotes a different, respective data item in the data log;
    for each of the keys, determining a data coverage of the corresponding key for each iteration of the data log, wherein the data coverage denotes a degree to which the corresponding key constitutes the data log in a given iteration;
    for each of the keys, generating a map indicating whether the data coverage of the corresponding key has changed between iterations of the data log; and
    determining adherence, by a processor, of at least one expression pattern rule that models data item stability characteristics over data log iterations to the map generated for each data set and for each key to identify at least one key exception as at least one unstable data item, respectively, in the data log.

12. The method of claim 11, wherein the method further comprises:
    outputting, based on the determining adherence, at least one of a key performance indicator for the data log or a list that includes the at least one unstable data item.

13. The method of claim 11, wherein each of the maps indicates, for each transition between iterations of the data log, whether the data coverage of the corresponding key has increased, decreased or remained unchanged for the corresponding transition.

14. The method of claim 11, wherein the at least one expression pattern rule models an unstable data item.

15. The method of claim 14, wherein the at least one expression pattern rule includes elements that denote transitions between iterations and wherein the elements denote at least two state switches between an increasing data coverage and a decreasing data coverage of the unstable data item modeled by the at least one expression pattern rule.

16. The method of claim 11, wherein the at least one expression pattern rule models a stable data item.

17. The method of claim 16, wherein the at least one expression pattern rule includes a set of elements that denotes consecutive transitions between iterations and wherein the set of elements denotes a state consistency between the consecutive iterations.

18. A system for identifying stability exceptions in a data log comprising:
a parser configured to receive the data log, which is comprised of at least one data set, at least one of which includes a corresponding plurality of iterations indicating binary transition states of the corresponding data set at different points in time, wherein at least one data item in the data log is denoted as a key, wherein each key denotes a different, respective data item in the data log;
a data encoder configured to determine, for each of the keys, a data coverage of the corresponding key for each iteration of the data log, wherein the data coverage denotes a degree to which the corresponding key constitutes the data log in a given iteration, and configured to generate, for each of the keys, a map indicating whether the data coverage of the corresponding key has changed between iterations of the data log; and
processor, configured to determine adherence of at least one expression pattern rule that models data item stability characteristics over data log iterations to the map generated for each data set and for each key to identify at least one key exception as at least one unstable data item, respectively, in the data log.

19. The system of claim 18, further comprising:
a computation module configured to calculate and output a key performance indicator based on a determination of adherence between the at least one expression pattern rule and the map generated for each data set and for each key.

20. The system of claim 18, wherein each of the maps indicates, for each transition between iterations of the data log, whether the data coverage of the corresponding key has increased, decreased or remained unchanged for the corresponding transition.

21. The system of claim 18, wherein the at least one expression pattern rule models an unstable data item, wherein the at least one expression pattern rule includes elements that denote transitions between iterations and wherein the elements denote at least two state switches between an increasing data coverage and a decreasing data coverage of the unstable data item modeled by the at least one expression pattern rule.

22. The system of claim 18, wherein the at least one expression pattern rule models a stable data item, wherein the at least one expression pattern rule includes a set of elements that denotes consecutive transitions between iterations and wherein the set of elements denotes a state consistency between the consecutive iterations.

23. The system of claim 18, further comprising:
a key encoder configured to generate, for each data set of the at least one data set and for each of the keys, another map indicating, for each iteration of the corresponding data set, whether the corresponding key is present in the corresponding iteration; and
a key matcher configured to determining adherence of at least one other expression pattern rule that models data item stability qualities over data set iterations to the other map generated for each data set of the at least one data set and for each of the keys to determine whether the corresponding other map satisfies the at least one other expression pattern rule.

24. The system of claim 23, wherein the at least one other expression pattern rule models an unstable data item, wherein the at least one other expression pattern rule includes a set of consecutive iterations and wherein transitions between iterations in the set of consecutive iterations denote state switches.

25. The system of claim 23, wherein the at least one other expression pattern rule models a stable data item, wherein the at least one expression pattern rule includes a set of consecutive iterations and wherein each transition between iterations in the set of consecutive iterations denotes a state consistency.

* * * * *